May 8, 1951     D. J. BLOOMBERG     2,552,138
DUAL ROTATION TURBINE
Filed April 21, 1945     2 Sheets-Sheet 1
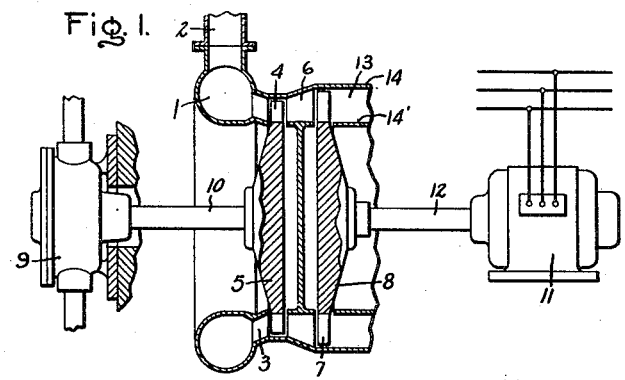
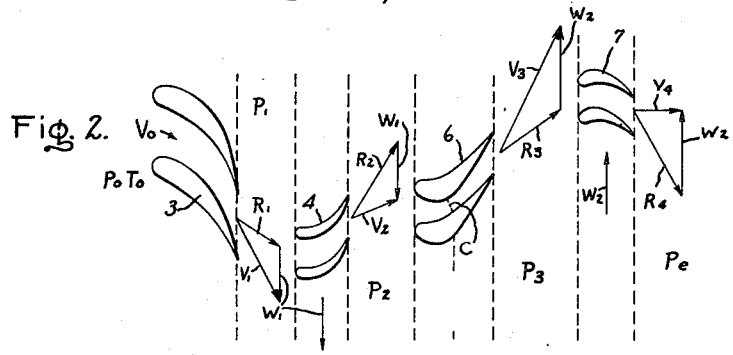
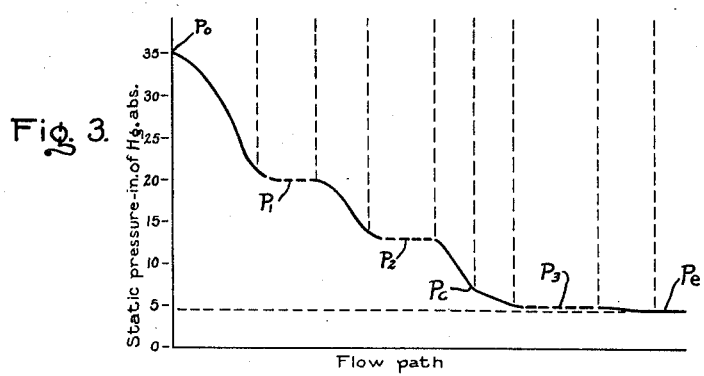
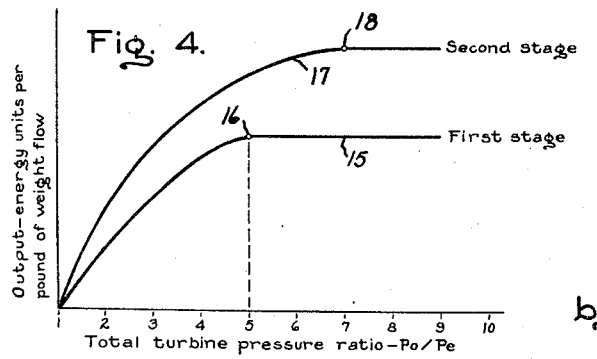
Inventor:
David J. Bloomberg,
by Harry E. Dunham
His Attorney.

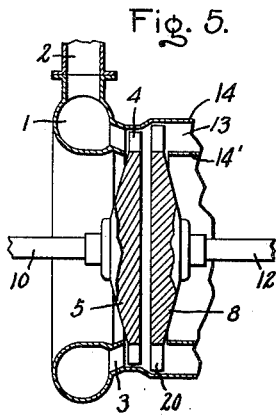
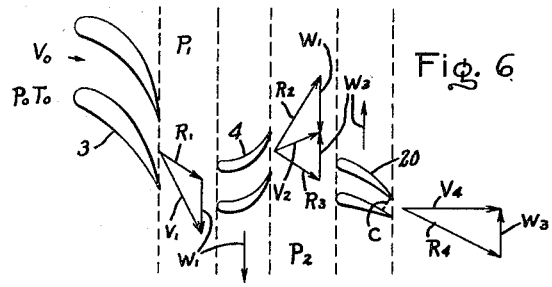
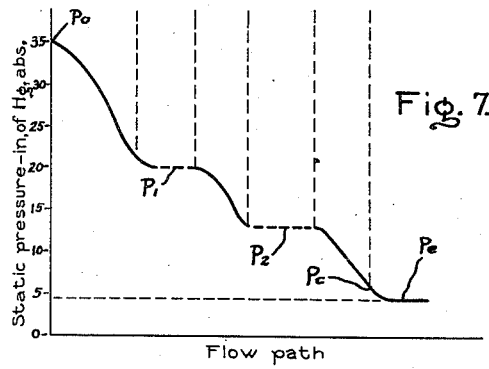
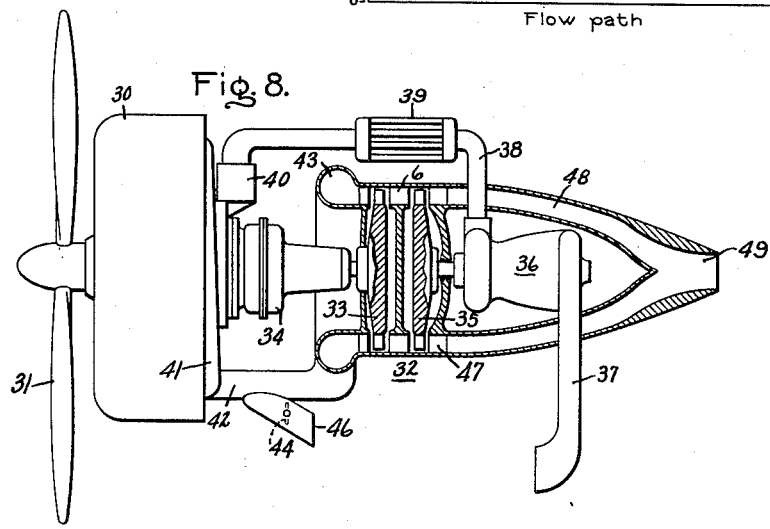

Patented May 8, 1951

2,552,138

UNITED STATES PATENT OFFICE 2,552,138

DUAL ROTATION TURBINE

David J. Bloomberg, Newton, Mass., assignor to General Electric Company, a corporation of New York Application April 21, 1945, Serial No. 589,569

5 Claims. (Cl. 253—16.5)

My invention relates to fluid pressure turbines, particularly high speed, high temperature gas turbines for use in aircraft.

An object of my invention is to provide means for converting the available energy of a high temperature, high pressure fluid into useful kinetic energy with apparatus having a minimum size and weight per unit of energy converted.

Another object is to provide a fluid pressure energy converting apparatus having a plurality of converter devices arranged in series flow relation with the flow path so designed that the available energy drop across a certain converter is limited by the occurrence of sonic velocity flow at a preselected cross section located downstream from that converter.

A further object is to provide a fluid pressure turbine arrangement with a plurality of rotors each arranged to rotate independently of the others and driving separate loads, the available energy drop across one of the rotors being limited to a predetermined value by the occurrence of sonic velocity in the fluid flow passage at a preselected cross section located downstream from that rotor.

A still further object is the provision of a turbine having a rotor designed to operate safely and efficiently at a predetermined maximum speed and being limited to that speed by the inherent design of the fluid flow passages downstream from that rotor.

Another object is to provide a dual rotation turbine having a first rotor the maximum speed of which is fixed by the design of the fluid flow passages at a preselected total turbine pressure ratio, and a second stage rotor designed to operate safely at increasing speeds as the total pressure ratio across the turbine increases above the preselected value.

Another object is to provide a dual rotation turbine having a first stage which can be designed for high efficiency by reason of the fact that the maximum range of pressure ratios across that stage is limited.

My invention permits the design of a turbine with independent rotors driving separate loads and having a first stage designed to operate safely with very high temperature gas at speeds up to a preselected maximum value; while a second rotor in series flow relation with the first operates at considerably lower temperatures, whereby it is enabled to operate at increasing speeds while the first stage speed remains fixed. My invention permits the use of operating fluid at a very high initial energy level, and a maximum conversion of energy with apparatus of a given size and weight.

Further objects and advantages will become apparent from the following description and the claims appended thereto, taken in connection with the accompanying drawings, in which Fig. 1 represents a dual rotation turbine having two rotors driving separate loads and designed in accordance with my invention; Fig. 2 is a diagrammatic representation of the fluid velocities in the flow path through a turbine arranged as in Fig. 1; Fig. 3 gives graphically the static pressure distribution along the fluid flow path of Fig. 2; Fig. 4 represents the energy output of the respective rotors of a turbine constructed in accordance with my invention as the total pressure ratio across the turbine increases; Fig. 5 illustrates a modification of the turbine shown in Fig. 1; Fig. 6 is a representative velocity diagram for a turbine such as that of Fig. 5; Fig. 7 represents the pressure drop through a turbine as in Fig. 5; and Fig. 8 illustrates an application to an aircraft powerplant of a turbine arranged in accordance with my invention.

It is well known that when a gas maintained at constant pressure in a hypothetical receiver of infinite volume flows through a well-rounded contracting nozzle in the wall of the receiver to a region of lower pressure, the velocity of flow at the minimum cross section of the nozzle will increase to the velocity of sound as a limiting value as the pressure drop across the nozzle increases. When this limiting sonic velocity condition is attained, the static pressure at the minimum section of the nozzle is determined by the critical pressure ratio, which is approximately .53 for hot gases such as those used to drive gas turbines. If the pressure ratio across the nozzle increases above the critical ratio, no further increase in velocity, or decrease in static pressure, at the throat of the nozzle will result. My invention lies in designing a fluid pressure energy converter so as to make use of this phenomenon to limit the pressure ratio across one of a number of pressure energy converting devices arranged in series flow relation.

It should be noted that in fluid pressure turbines which may have a number of nozzles and bucket wheels in series flow relation, the flow conditions are quite complex compared with the elementary case of a gas flowing through a simple nozzle from a reservoir of infinite volume. In a turbine, the velocity of approach must be taken into consideration in determining the static pressure existing at a minimum flow section where sonic velocity occurs. In this case the static pressure at the minimum flow section is determined by the critical pressure ratio for the gas and the total or impact pressure just above the minimum section. If a gas is flowing through a conduit having a restriction across which the pressure ratio is greater than the critical ratio, and the fluid approaches the restriction with a velocity $V_2$ and static pressure $P_2$, then the static pressure at the minimum section will drop to a value $P_c$ such that the drop in pressure from $P_2$ to $P_c$ will produce an increase in velocity from $V_2$ to the velocity of sound in the gas at that temperature and pressure. It is obvious that the higher the approach velocity, the smaller the static pressure drop required to produce sonic velocity at the minimum section.

It should also be noted that when dealing with "sonic velocity" in the flow path of a turbine which includes stationary nozzles and guide vanes and moving buckets arranged in series flow relation, the velocity referred to must be that of the gas relative to the walls defining the flow path at the particular section being considered, irrespective of any absolute velocity the flow path walls may themselves have in space.

In Fig. 1 hot gaseous motive fluid is supplied to a nozzle box 1 by the conduit 2. Stationary nozzles 3 conduct the operating medium to the buckets 4 of the first stage rotor 5. Fluid discharged from the first stage buckets enters the intermediate stationary blades 6, which in turn deliver the fluid to buckets 7 of the second stage wheel 8.

The first stage rotor 5 is arranged to drive an energy consuming device 9 through a shaft 10 supported in suitable bearings (not shown). For purposes of illustration the load 9 is represented as a device for pumping liquids or gases.

The second stage rotor 8 drives a second independent energy consumer 11 through a shaft 12. The load 11 is illustrated as an electrical generator delivering energy to suitable mains. The spent fluid leaves the turbine through an annular discharge passage 13 formed by cylindrical walls 14 and 14'.

While I have illustrated particular types of energy consuming loads in Fig. 1, it is to be understood that any loading device can be used provided it has a known speed-load characteristic such that the load increases as a function of increasing speed.

In the following description, and in the claims appended, the term "first stage" is to be understood to include the nozzles 3, the first stage buckets 4, and the clearance space between nozzles and buckets and also that between the buckets and the suceeding element (the stationary vanes 6 in Fig. 1 or the second stage buckets 20 in Fig. 5, as the case may be). The term "second stage" is intended to include the intermediate vanes 6, if present, and the second stage buckets, including the clearance space between vanes 6 (if present) and the second stage buckets, and also including the space immediately beyond the second stage bucket exit.

Fig. 2 is a graphic representation of the fluid velocities which may occur in a turbine having a flow path arranged as in Fig. 1. Gas at pressure $P_0$ and temperature at $T_0$ enters the nozzles 3 at a comparatively small velocity $V_0$ and expands through the nozzle to an absolute spouting velocity $V_1$. By reason of the rotation of the first stage rotor, buckets 4 have a linear velocity $W_1$ so that the relative velocity of the gas entering the first stage buckets is represented by vector $R_1$. Buckets 4 are designed so that gas with a relative velocity $R_1$ will enter the bucket passages with a minimum of shock. Vector $R_2$ represents the velocity of the gas leaving the first stage buckets, and is shown as greater in magnitude than $R_1$ by reason of expansion occurring in the first stage bucket passages. Because of the first stage wheel velocity $W_1$, the gas enters the passages defined by intermediate vanes 6 with an absolute velocity $V_2$. In the stationary vane passages the gas expands still further, the velocity increasing to the velocity of sound at a preselected critical section C. The remainder of the passage through the stationary vanes, downstream from the minimum section, may be so designed as to produce a further expansion so that the velocity increases above sonic. Vector $V_3$ represents the absolute velocity of gas issuing from the stationary vane 6. By reason of the bucket velocity $W_2$ of the second stage rotor, the relative velocity of the fluid entering the second stage buckets is $R_3$. The fluid may expand still further in the second stage bucket passages to produce a relative exit velocity $R_4$. By proper design the residual velocity $V_4$ leaving the second stage buckets may be in a substantially axial direction. This may be particularly advantageous where the discharge from the second stage turbine is used further for jet propulsion of an aircraft.

Fig. 3 illustrates the manner in which the static pressure drops along the flow path of Fig. 2. The initial value $P_0$ in the nozzle box drops to $P_1$ in the clearance space between the nozzles and the first stage buckets, and drops further in passing through the first stage buckets to $P_2$, the pressure existing between the first stage buckets and the stationary blades 6. In flowing through the stationary blades the pressure drops from $P_2$ to the critical pressure $P_c$ at the critical section C, at which place sonic velocity flow occurs. Beyond section C the pressure drops to $P_3$, and from $P_3$ to exhaust pressure $P_e$ in passing through the second stage buckets. It should be noted that there may be a slight drop in pressure and corresponding expansion of the fluid in the space immediately adjacent the exit of a nozzle or bucket passage.

While in Fig. 2 the critical cross-sectional area at which the limiting sonic velocity occurs has been illustrated as occurring at a section C midway between entrance and exit of the stationary vanes 6, it should be understood that by proper design of the flow path this section may be located at the entrance to the vanes 6, or at the exit of the flow path formed by vanes 6, or at any section between the entrance and exit of the stationary vanes.

Fig. 4 illustrates the energy output of the first stage rotor and the second stage rotor respectively, the abscissa being the total turbine pressure ratio $P_0/P_e$, while the ordinate is energy units of output per pound of operating medium flowing. The output of the first stage rotor, represented by lower curve 15, increases as the total pressure ratio across the turbine increases until sonic velocity flow occurs at the critical cross section C, represented by point 16 on the curve. Beyond point 16, the first stage output remains constant. It should be noted that after the sonic velocity condition has been reached at section C, the velocity diagram represented in Fig. 2 and the pressure distribution of Fig. 3 will remain unchanged from the inlet to the nozzles 3 up to section C, regardless of any subsequent changes occurring downstream from that section, as the total turbine pressure ratio increases still further.

The output of the second stage rotor may be represented by the curve 17 which may increase smoothly until it reaches point 18, at which point the fluid discharged from the second stage rotor completely fills the annual discharge passage 13 and reaches sonic velocity measured in an axial direction and relative to the walls 14, 14'. This sonic velocity condition in the turbine discharge passage represents the absolute limit to the total turbine output. Even after this point has been reached, however, the fluid discharged through annulus 13 can be usefully expanded still further in some other pressure energy converting device downstream, provided of course the pressure in the discharge passage 13 is still above the exhaust pressure $P_e$.

Fig. 5 illustrates another form of dual rotation turbine which may embody my invention which omits the intermediate vanes 6, the second stage rotor 20 receiving directly the fluid discharged from the first rotor 4. This type of turbine arrangement has many advantages, both from the standpoint of efficient fluid flow and from the standpoint of lower weight because of the simplified mechannical construction.

Fig. 6 is the velocity diagram for a turbine such as shown in Fig. 5, and this diagram is identical with that of Fig. 2 up to the exit of the first stage bucket. The velocity $W_3$ of the second stage buckets 20 results in the fluid entering those buckets with a relative velocity $R_3$. The fluid expands further in the second rotor until it reaches sonic velocity at the critical section C, represented here as being located exactly at the exit of the second stage bucket passage. Again, by proper design the residual velocity $V_4$ relative to the discharge passage 13 may be made substantially axial.

Fig. 7 gives the static pressure distribution along the fluid flow path of Fig. 6. It should be noted here that where the sonic velocity flow occurs exactly at the exit of the second stage buckets, the static pressure drops from $P_c$ to the exhaust pressure $P_e$, with an accompanying expansion and increase in velocity, in the region immediately beyond the bucket exit. Tests show that when the fluid flow path is thus designed to produce sonic velocity exactly at the bucket exit, the energy output of that rotor continues to increase with increasing pressure ratio beyond the point 16 at which sonic velocity flow occurs (as represented by curve 17 in Fig. 4), the ultimate limit being reached at point 18. It appears that the further expansion of the fluid from the pressure $P_c$ at the bucket exit in Fig. 7 down to the exhaust pressure $P_e$ in the region immediately beyond the bucket exit contributes to the output of the second stage rotor.

It may be noted that the specific velocity and pressure distributions and the blade shapes illustrated in Figs. 2, 3, 6 and 7 have not been calculated with mathematical exactness, but are intended merely to represent values typical of those which might be designed in accordance with my invention.

In designing an aircraft turbine in accordance with my invention, it is necessary to first select the "critical altitude," defined as the preselected altitude corresponding to the total turbine pressure ratio at which sonic velocity flow occurs at the critical flow section C. For design purposes, it is necessary to assume that the nozzle box pressure and temperature remain constant at predetermined values depending upon the nature of the source of motive fluid, the types of materials used in the nozzles, nozzle box, etc. In modern gas turbines the inlet temperature may be 1500° F. or higher. If the operating fluid is derived from a supercharged reciprocating internal combustion engine, the nozzle box pressure may be maintained at sea level atmospheric pressure or at higher pressures, for instance up to 60 inches of mercury absolute. If the turbine is part of a constant pressure combustion turbine powerplant the inlet pressure may be even higher. It is also necessary to select a rate of weight flow of the operating fluid, depending upon the total power output desired. Starting with these preselected values, it is possible by known principles of turbine design to determine the shape and cross section areas of the nozzles 3.

The first stage bucket wheel is then designed, in accordance with known principles, so as to operate safely at rotational speeds up to preselected maximum, taking into consideration the temperature at which the parts of the bucket wheel operate and the strength-life characteristics of the various materials of which those parts are made. The first rotor bucket passages are then designed by known methods to produce desired velocities, such as those represented by the velocity diagrams in the accompanying drawings.

The flow passages through the stationary vanes 6, or the buckets 20 as the case may be, are next designed by known methods to produce the desired velocities and pressure drops, and are especially designed so that sonic velocity flow occurs at the preselected critical section C when the total turbine pressure ratio corresponds to the critical altitude. While for purposes of illustration the critical section C has been represented in Fig. 2 and Fig. 6 as being the narrowest portion of the fluid flow path through the turbine, it will be appreciated by those skilled in the art of turbine design that this critical section may not actually be the section having the geometrically smallest cross-sectional area. As the pressure drops along the fluid flow path, the temperature decreases by reason of the expansion and the work energy removed from the fluid by the turbine rotors; and the specific volume increases by reason of the progressive expansions. The interrelation of pressure, temperature, and specific volume of the fluid is determined by the physical laws governing the behaviour of compressible fluids. This known interrelation between the various characteristics of the fluid must of course be taken into account in proportioning the fluid flow path so that sonic velocity will occur at the preselected critical section C when the total turbine pressure ratio corresponds to the preselected critical altitude.

The energy theoretically available from a given stage per pound of fluid flowing is a function of the initial pressure and temperature of the operating fluid and the drop in pressure from the initial pressure to the exit of that stage. In accordance with my invention, the fluid flow passages are so designed that the pressure drop in the first stage is definitely limited by the occurrence of sonic velocity at a section in the flow path downstream from the first stage Since the pressure ratio across the first stage is thus limited, it follows that if the initial temperature remains constant the energy available to the first stage is also limited. If the first stage rotor is connected to a load, such as the pump 9 in Fig. 1, having a known speed-load characteristic in which the load increases as a function of increasing speed, then it is possible to so match the turbine to the load that the speed of the first stage rotor will not rise above a predetermined safe value. From a consideration of these facts, it will be seen that curve 15 in Fig. 4 may also be considered to represent the speed of the first stage rotor, and that the speed will not increase above the value occurring at point 16.

Thus, my invention enables the designer to limit the speed of the first stage rotor of a dual rotation turbine to a preselected safe value by the inherent design of the fluid flow passages downstream from that rotor, without employing the usual complex mechanical and hydraulic speed governing mechanisms. Because the first rotor speed can thus be positively limited, it is possible with safety to design the turbine so that the first rotor operates much closer to the ultimate strength limits of its materials than can be done in machines where a safety factor must be introduced to provide for unintentional increases of the rotor speed beyond the maximum value for which it was designed. Therefore, with my invention optimum use of the turbine materials and structures can be made by operating ordinarily with conditions closer to the ultimate safe values than is possible otherwise. This means that a turbine in accordance with my invention can be made lighter in weight for a given total output.

It may also be noted that a fluid pressure turbine can be designed to operate most efficiently only at some particular value of total pressure ratio, and compromises with respect to efficiency must be made by the designer if the rotor is required to operate over a very considerable range of pressure ratios. Because the range of pressure ratios across the first stage of a turbine designed according to my invention is limited, it is possible to design the first rotor so as to maintain a higher average efficiency over the limited operating range.

From a consideration of the pressure distributions represented by Figs. 3 and 7 it will be seen that the operating temperatures of the second stage rotor will be very considerably less than those in the first rotor. Since the strength and life characteristics of turbine bucket wheel materials are very greatly improved by only a small reduction in operating temperatures, it is possible to design the second stage rotor to operate safely at speeds increasing considerably above that value to which the first stage rotor is limited.

For purposes of illustration, the operation of a turbine constructed in accordance with my invention will be described as if it were in an aircraft with the nozzle box receiving hot gas at a constant pressure and temperature and with the second stage rotor exhausting directly to atmosphere so that the back pressure on the turbine corresponds to ambient atmospheric pressure and decreases as altitude increases. Because a constant nozzle box pressure is assumed, it will be seen that the total turbine pressure ratio, as represented by the abscissa of Fig. 4 will be a function of altitude. At sea level there would be no pressure drop across the turbine except for that required to overcome the friction losses in the fluid flow passages, and therefore no useful output from the turbine rotors. As altitude increases, the output of the two rotors will increase along curves 15 and 17 respectively, with sonic velocity occurring at no point in the flow path downstream from the first stage. As the total pressure ratio continues to increase, the fluid velocity and weight flow through the flow path will likewise increase until the point 16 is reached, at which the velocity of the fluid at the critical section C, relative to the flow path walls at that point, becomes equal to the velocity of sound in the fluid for the temperature and pressure occurring at that point. When this occurs no further increase in weight flow through the flow path can take place as long as the initial conditions $P_0$, $T_0$ remain constant. Furthermore, at higher total pressure ratios the static pressure $P_c$ at the section C will remain constant and the fluid pressure and velocity distribution in the flow path down to the section C will remain fixed. Therefore, the energy available to the first stage of the turbine is definitely fixed; and if the first rotor is directly connected to a load which increases as a function of speed, then the speed of the first rotor will also be limited.

However, as the total turbine pressure ratio increases above the value at point 16 in Fig. 4, the fixed weight flow traversing the path through the turbine will deliver an increasing amount of energy to the second stage rotor by reason of the fact that the pressure ratio from the fixed pressure $P_c$ down to the exhaust pressure $P_e$ will increase as the back pressure on the turbine decreases. Thus the second rotor is enabled to deliver a further increasing energy output beyond the point 16 at which the first stage output becomes fixed. If then the second stage rotor is directly connected to a load having an increasing speed-load characteristic, the speed of the second rotor will increase until both speed and output reach maximum values at the point 18 by reason of the occurrence of sonic velocity in the discharge passage 13.

It may be noted that when my invention is applied to a turbine without intermediate vanes, as shown in Fig. 5, the speed and output of the first rotor may not be precisely fixed but may vary slightly as the speed of the second rotor increases above the critical altitude. The reason for this will be apparent from a consideration of Fig. 6. The velocity vector $R_3$ representing the inlet velocity relative to the second stage buckets is in effect the "velocity of approach" with respect to the restricted section C. As the second rotor speed increases above the critical altitude, the wheel velocity vector $W_3$ will lengthen and thus cause a change in the magnitude of the resultant inlet velocity vector $R_3$. This change in the "velocity of approach" to the section C will result in some slight redistribution of the velocities and static pressures upstream from the restricted section C. Thus, with the turbine arrangement shown in Fig. 5 it is not strictly true that the velocity and static pressure distribution all the way down to the critical section C remain absolutely fixed as the total turbine pressure ratio increases above the critical value. However, the effect of a change in the second rotor speed on the velocity and pressure conditions upstream from the section C is insignificant and may be disregarded for most practical purposes.

The above description of the method of operation assumed that as the total turbine pressure ratio increases, sonic velocity occurs first at the critical section C. However with some turbines designed in accordance with my invention, sonic velocity may occur first at some section within the first stage, that is, in the nozzles 3 or passages between buckets 4. When this occurs, the weight flow through the flow path becomes constant in spite of further increases in total pressure ratio (assuming inlet pressure and temperature remain constant). However, this sonic velocity condition in the first stage does not affect the output and speed of the first stage rotor, which continue to increase along the curve 15 until point 16 is reached, at which sonic velocity occurs also at the section C to thereby limit the speed and output of the first stage as before.

It will be seen that my invention permits the design of a dual rotation turbine having a first stage driving a first-load which is definitely limited in speed and output by the occurrence of sonic velocity at a preselected section of the flow path and with a predetermined total turbine pressure ratio, while a second independent rotor driving a separate load is free to rotate at increasing speeds to deliver an increasing energy output as the total turbine pressure ratio increases beyond the value at which the first stage speed and output becomes fixed.

Fig. 8 illustrates one application of a turbine constructed in accordance with my invention to an aircraft power plant, consisting of a conventional reciprocating internal combustion engine 30 driving propeller 31, and a two-stage dual rotation gas turbine 32. The first stage rotor 33 of the turbine delivers power to the crank-shaft of engine 30 through any suitable type of gearing, such as the hydraulic coupling 34. The second stage rotor 35 drives a compressor 36 which takes in air through conduit 37 and discharges it through conduit 38, intercooler 39 and carburetor 40 to the engine 30. Hot engine exhaust gases from the collector annulus 41 are led by conduit 42 to the turbine nozzle box 43. A waste-gate 44 actuated by any suitable type of regulator (not shown) permits the discharge of some hot gas directly to atmosphere through port 46, so as to maintain a desired constant pressure in nozzle box 43. The turbine may be provided with intermediate guide vanes 6 as in Fig. 1, or they may be omitted as in the turbine of Fig. 5.

Immediately following the second stage buckets there may be provided an annular row of blades 47, which may be merely guide vanes to straighten out the flow of gases discharged from the second stage, without any change in pressure, or the blades 47 may be shaped to form diffusing passages converting some of the residual velocity of the turbine back into static pressure energy. From the blades 47 the fluid passes through annular discharge passage 48 to the propulsion nozzle 49.

This arrangement is particularly advantageous in an aircraft powerplant for the limited speed first stage turbine rotor is coupled to a load which also operates normally at substantially constant speed; while the second stage turbine driving the supercharger 36 is free to rotate at increasing speeds as altitude increases to provide the supercharging required to maintain substantially constant the engine inlet manifold pressure.

In connection with the powerplant of Fig. 8 it may be noted that the blades 47 may also be designed with a critical flow section to limit the pressure drop across the second stage rotor, just as the section C limits the drop across the first stage. With such an arrangement sonic velocity would occur first at the section C, limiting the output and speed of the first rotor; then as altitude increased still further, sonic velocity would also occur at the critical section in the blades 47 to limit second stage output and speed; and at still higher altitudes any further drop in pressure would occur in the passage 48 and propulsion nozzle 49.

While I have described one application of my invention, many others will occur to those skilled in the art. For instance, instead of being used in connection with a conventional reciprocating engine as illustrated in Fig. 8, a turbine in accordance with my invention may be embodied in a constant pressure gas turbine powerplant, the first stage driving a geared propeller and the second stage driving a compressor furnishing air to one or more combustion chambers. My invention is also applicable to multi-stage compressors with two mechanically independent stages driven by the respective stages of the turbine. It will also be apparent that the first stage of the turbine might drive a generator for supplying auxiliary electric power on an aircraft while the second stage rotor drives a compressor for furnishing air to a pressure cabin or to the engine or to other consumers.

While the examples given herein have represented a turbine arrangement having independent stages rotating in opposite directions, it will be obvious to skilled turbine designers that by suitable design the stages could be made to rotate in the same direction at different speeds. It will also be apparent that the shape, and position relative to each other, of the output curves in Fig. 4 may be made to suit the requirements of the particular application, so long as the energy conversion in the first stage reaches a maximum constant value when sonic velocity occurs at a critical flow section downstream from the first stage, while the output of a second energy converter downstream from the critical flow section increases beyond the point at which the limiting sonic velocity flow occurs.

What I claim as new and desire to secure by Letters Patent of the United States, is:

1. Fluid pressure energy converting apparatus including means for supplying compressible gaseous fluid at a substantially constant pressure and temperature, a first energy-converting device, a second energy-converting device, and conduit means connecting the supply means to the first device and the first device to the second device, said conduit means and said devices having walls defining a fluid flow path with a portion of critical cross-section area located downstream from the first device and of such a size that the pressure drop across the first device is limited to a predetermined value by the occurrence of sonic velocity at the critical section.

2. In a fluid pressure energy converting apparatus the combination of a source of compressible gaseous operating medium at substantially constant pressure and temperature, a first pressure energy converting device including a turbine rotor constructed and arranged to operate safely at speeds up to a preselected maximum, an energy consumer connected to the turbine rotor and having a load characteristic increasing as a function of speed, a second pressure energy converting device, and conduit means connecting said source to the first device and the first device to the second device in series flow relation, said conduit means, first device, and second device having walls defining a fluid flow path including a portion of critical cross section area located downstream from the first device and of a preselected size to limit the speed of the turbine rotor to its maximum safe value by the occurrence of sonic velocity at the critical section.

3. A fluid pressure turbine arrangement including a source of compressible gaseous fluid at a high substantially constant energy level, a first stage including nozzle means and a first stage rotor, a power consumer connected to the first stage rotor, a second stage including a second stage rotor arranged to rotate independently of and in series flow relation with the first stage rotor, and a second power consumer connected to the second stage rotor, said nozzle means, first stage, and second stage defining parts of a fluid flow path having a portion of a preselected critical cross-section area located downstream from the first stage and of such a size that, as the total pressure ratio increases, the energy drop in the first stage is limited by the occurrence of sonic velocity flow at the critical section.

4. In an aircraft power plant the combination of a source of compressible gaseous fluid at substantially constant pressure and temperature, a first energy converting device including a turbine rotor constructed to operate safely at speeds up to a preselected maximum and to deliver a preselected fixed output at that speed, an energy consumer connected to the turbine rotor and having a load characteristic increasing as a function of speed, a second energy converting device discharging to a back pressure which decreases as a function of increasing altitude, conduit means connecting the source to the first device and the first to the second device in series flow relation, the conduit means and the first and second devices having walls defining a fluid flow path including a preselected critical cross-section area located downstream from the first device and of a size to substantially limit the speed and output of the turbine rotor to the preselected values by the occurrence of sonic velocity flow at the critical section when operating with a preselected back pressure substantially less than the critical pressure, the second energy converting device being constructed to safely translate increasing amounts of energy as the back pressure decreases below said preselected value.

5. In a composite aircraft power-plant, the combination of an engine-propeller unit adapted to operate at substantially constant speed in normal operation, a compressor supplying air at superatmospheric pressure to the induction system of the engine, and a dual rotation turbine between engine and compressor, said turbine comprising nozzle means adapted to receive hot exhaust gases from the engine, a first bucket-wheel arranged to receive motive fluid from the nozzle means, a second mechanically independent bucket-wheel arranged in series flow relation with the first wheel, walls defining a conduit between the bucket-wheels, and gearing connecting the first bucket-wheel to the engine and the second wheel to the compressor respectively, said conduit and second bucket-wheel defining a fluid flow path including a critical cross-section having an area of a size which substantially limits the speed of the first bucket-wheel to a preselected safe value by the occurrence of sonic velocity at the critical section when operating with a preselected back pressure materially less than the critical pressure, the second bucket-wheel being constructed and arranged to operate at increasing speeds as the back pressure decreases below said preselected value.

DAVID J. BLOOMBERG.

REFERENCES CITED

The following references are of record in the file of this patent:

UNITED STATES PATENTS

| Number | Name | Date |
|---|---|---|
| 2,258,793 | New | Oct. 14, 1941 |
| 2,312,995 | Anxionnaz et al. | Mar. 2, 1943 |
| 2,378,372 | Whittle | June 12, 1945 |
| 2,435,236 | Redding | Feb. 3, 1948 |